United States Patent [19]

Richards

[11] Patent Number: 5,593,270

[45] Date of Patent: *Jan. 14, 1997

[54] COMPACT TRAILER HAVING HYDRAULIC FORK LIFT

[76] Inventor: Howard E. Richards, 405 Daniel Dr., West Melbourne, Fla. 32904

[*] Notice: The term of this patent shall not extend beyond the expiration date of Pat. No. 5,415,516.

[21] Appl. No.: 388,626

[22] Filed: Feb. 14, 1995

Related U.S. Application Data

[63] Continuation of Ser. No. 273,501, Jul. 11, 1994, Pat. No. 5,415,516.

[51] Int. Cl.$^6$ ..................................................... B60P 3/07
[52] U.S. Cl. ........................ 414/458; 187/234; 414/495; 254/2 R
[58] Field of Search ........................................ 414/458, 459, 414/111, 132, 24.5, 460, 461, 539, 540, 914, 799, 560, 592, 495, 722, 724, 607; 254/2 R, 8 R, 9 R, 9 B, 9 C, 120, 124, 93 R, 93 VA; 280/63, 400, 423.1; 187/222, 226, 229, 230, 233, 234, 237, 238, 250, 253, 269, 244

[56] References Cited

U.S. PATENT DOCUMENTS

| | | | |
|---|---|---|---|
| 3,086,618 | 4/1963 | Christiansen | 187/222 |
| 3,272,365 | 9/1966 | Stevens | 187/222 X |
| 3,974,926 | 8/1976 | Kopaska | 414/24.5 |
| 4,002,147 | 1/1977 | Feterl | 414/458 X |
| 4,944,648 | 7/1990 | Parr | 414/490 X |
| 5,067,869 | 11/1991 | Reuss et al. | 414/460 X |

FOREIGN PATENT DOCUMENTS

| | | | |
|---|---|---|---|
| 1267111 | 3/1990 | Canada | 414/495 |
| 2607642 | 9/1976 | Germany | 187/22 |
| 630032 | 5/1982 | Switzerland | 414/495 |
| WO94/06711 | 3/1994 | WIPO . | |

*Primary Examiner*—Frank E. Werner
*Attorney, Agent, or Firm*—Charles E. Wands

[57] ABSTRACT

A compact utility trailer for pick-up and delivery of relatively small sized lots of material is readily towable behind a variety of commonly driven vehicles such as automobiles, pick-up trucks and the like, and contains a hand operated hydraulic jack-operated forklift that allows a pallet of material to be easily seized and lifted into a transport position within the confines of the trailer. The trailer comprises a front end hydraulic jack-mounting portion, and a rear end pallet-housing portion affixed thereto within which a pallet is to be seized and transported. The front end hydraulic jack-mounting portion has a longitudinal member having a trailer hitch fixture. A floor is affixed to the front end portion, and a hydraulic jack is mounted to the floor. A driven piston of the jack is vertically translatable to engage a fork lift-translating lever unit, which is coupled to a fork lift frame supported in the rear end portion of the trailer. The fork lift has generally L-shaped fork plates affixed to the fork lift frame, and fork lift guide channels, in which vertical side members of the fork lift frame are vertically translatable. An attachment member provides pivotable attachment of the fork lift frame to a lever arm of the fork lift-translating lever unit.

11 Claims, 4 Drawing Sheets

COMPACT TRAILER HAVING HYDRAULIC FORK LIFT

This is a continuation of application Ser. No. 08/273,501, filed Jul. 11, 1994, now U.S. Pat. No. 5,415,516, issued May 16, 1995.

FIELD OF THE INVENTION

The present invention relates in general to utility trailers and is particularly directed to a compact trailer that is readily towable behind an automobile, truck or the like, and is configured to readily seize, securely support during transport and release material, such as may be supported on a forklift enagageable pallet.

BACKGROUND OF THE INVENTION

The transportation industry currently employs a diversity of vehicles to haul and deliver cargo from a source site, such as a railhead or central warehouse, to an end customer/user, such as a retail outlet or service site. For this purpose, various types of trucks and trailers are used in many commercial, industrial and agricultural applications to convey differently sized cargos to their destination. At present, because of their substantial cargo capacity, tractor trailers comprise a principal mode of conveyance for both large and small sized lots of material, and are often used for both long and short haul applications. While the former usage is generally considered an efficient utilization of such vehicles, employing such vehicles for local deliveries of small sized lots is a less than desirable (not optimally efficient and cost effective) means of transportation. Still, because of the unavailability of a practical transport mechanism that facilitates pick-up and delivery of a relatively small sized lot of material, tractor trailers continue to be used as a less than optimal transport mechanism.

In addition to the need for a practical transport mechanism that facilitates pick-up and delivery of a relatively small sized lot of material from a central source, there are many material handling and delivery requirements where not only is a small platform all that is required, but the transport path does not allow for a large vehicle. Non-limiting examples are the transport of a pallet of sod from a landscaping supply facility to a residential site, movement of warehouse inventory, local delivery of produce from a depot to a retail grocery, etc.

SUMMARY OF THE INVENTION

In accordance with the present invention, the above requirements are successfully addressed by a new and improved compact utility trailer is readily towable behind an automobile, truck or the like, and contains a hydraulic jack-operated forklift through which a pallet, upon which material to be transported is supported may be readily seized and lifted into a transport position within the confines of the trailer. The trailer may then be towed to a delivery site, where the forklift is again operated to lower the pallet onto the ground for release.

To this end, the compact utility trailer of the present invention comprises a front end portion having a generally triangularly-shaped frame, that is formed of welded together sections of generally rectangular or U-shaped cross-section steel channel. A longitudinal section of the triangular frame has a forwardmost end thereof fitted with a ball hitch attachment element, for attachment to a ball-shaped attachment fixture that is secured to the rear end of a towing vehicle, such as a pick-up truck. The longitudinal section also has a pivotable support wheel for supporting the forward end of the trailer in a generally horizontal position, when the trailer is in a free standing condition, not attached to a ball attachment fixture at the back of a towing vehicle.

A floor member of non-skid steel sheet is welded to the triangular frame, and provides a support surface for hand-operated hydraulic jack and to enhance the rigidity of the triangular frame member. The hydraulic jack includes a hydraulic cylinder unit into which a driven piston element is vertically translatable. The upper end of driven piston element of the jack engages a pivotable arm of a fork lift-translating lever unit. The lever unit includes a vertically extending column member which is welded to the floor of the triangular frame. The column member has a slot in its upper end for receiving a first end of the pivotable arm. A pin passes through a bore in the column member and through a corresponding bore in the pivotable arm, to provide a pivotable attachment of the arm pivotable to the column member, so that the pivotable arm may pivot about the axis of the pin. A second end of the pivotable arm is attached by way of a horizontal pin to a pivot arm bracket. A lower end of the pivot arm bracket is pivotably attached to a vertically translatable fork lift frame. This attachment allows the pivotable arm to be vertically pivoted by vertical movement of the driven piston element of the hydraulic jack against the pivotable arm of the lever unit. The hydraulic jack is operated by manual control of a jack lever handle, thereby enabling the fork lift frame to be vertically translated within a pair of fork lift guide channels, that are affixed to a sub-frame portion of a generally housing or cage-shaped rear end portion of the trailer.

The generally housing or cage-shaped rear end portion of the trailer is affixed to the front end portion of the triangular frame. The cage-shaped portion of the trailer is comprised of a front end facing vertically extending rectangular-shaped wall frame section and a pair of vertically extending rectangular-shaped side wall sections. A roof section is attached to the top of each of frame and side sections. The forward wall frame section may be comprised of welded together sections of generally rectangular or U-shaped cross-section steel channel, including vertical side members welded to corners of the triangular frame.

Wheel axle-mounting brackets for trailer support wheels are mounted generally midway along each of the side wall sections. Trailer support tires are mounted on the trailer support wheels. Fenders are welded to bottom horizontal channel members of the side wall sections. The rear end portion of each of the fenders is provided with safety lights and reflective surfaces. Electrical energization of the lights is be provided by way of a conventional wiring harness. The open end of the cage-shaped rear end portion of the trailer is closable by means of a generally rectangularly shaped half door, which is formed of a rectangular frame of sections of steel tubing, attached by hinge members to one of the vertical side members.

To provide additional structural rigidity to and enclose the generally cage-shaped rear end portion of the trailer, layers of steel mesh are affixed to each of the vertically extending rectangular-shaped wall frame section and the pair of vertically extending rectangular-shaped side wall sections. In addition, a layer of steel mesh overlay is affixed to the roof frame structure and a layer of steel mesh is affixed to half door.

A fork lift guide is formed by a pair of vertical sections of U-shaped channel, that are respectively welded to the sub-frame. The fork lift is comprised of a generally rectangular frame having vertical side channel members welded to a lower section of horizontally extending steel channel, and to an upper section of horizontally extending steel channel. The fork lift frame also has a generally centrally located vertical channel member, which allows attachment of the lever arm bracket for the hydraulic jack, thereby enabling the fork lift frame to be vertically translated within the fork lift guide.

One or more (preferably a pair of) generally L-shaped fork plates are welded to vertical the fork lift frame. Vertical side channel members of the fork lift frame are sized to slide within the U-shaped channel sections of the fork lift guide, so that the fork elements may be vertically translated from a lowermost position at which a pallet may be engaged by the fork lift, and a raised position that provides sufficient clearance above the ground for transport of the pallet.

To use the compact forklift trailer to transport a pallet of material, first the rear half door is opened, and the hydraulic jack is manually operated, so as to pivotally rotate the pivotable arm of the lever unit downwardly, thereby vertically translating the fork lift frame in the fork lift guide towards the ground, so that the fork plates are lowered to a horizontal position at which the fork plates may be inserted into the open frame of a support pallet. The trailer is then backed over the support pallet upon which the material to be transported is situated, so that the fork plates engage the pallet. The hydraulic jack is then operated to raise drive piston element and rotate pivotable arm upwardly, thereby lifting the fork lift frame within the fork lift channels, and raising the pallet off the ground to a transport, road clearance position within cage-shaped rear end portion. The rear half door is then closed, so that the trailer may be towed. At the delivery site, the above sequence is reversed, so that the pallet is deposited on the ground.

DETAILED DESCRIPTION

Figure 1:
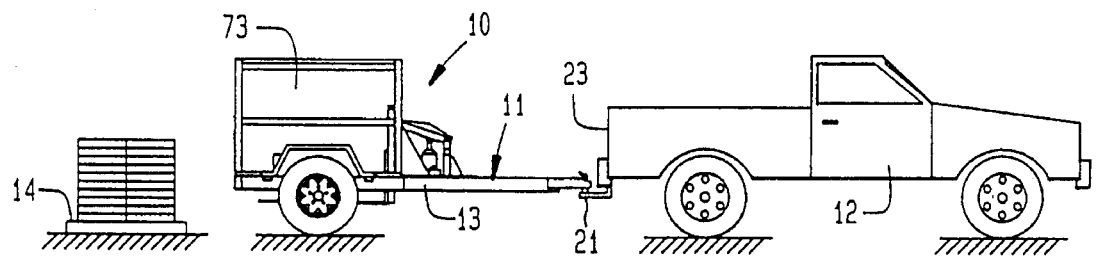
FIG. 1 shows a compact trailer of the present invention attached to a towing pick-up truck adjacent to a pallet.
Figure 2:
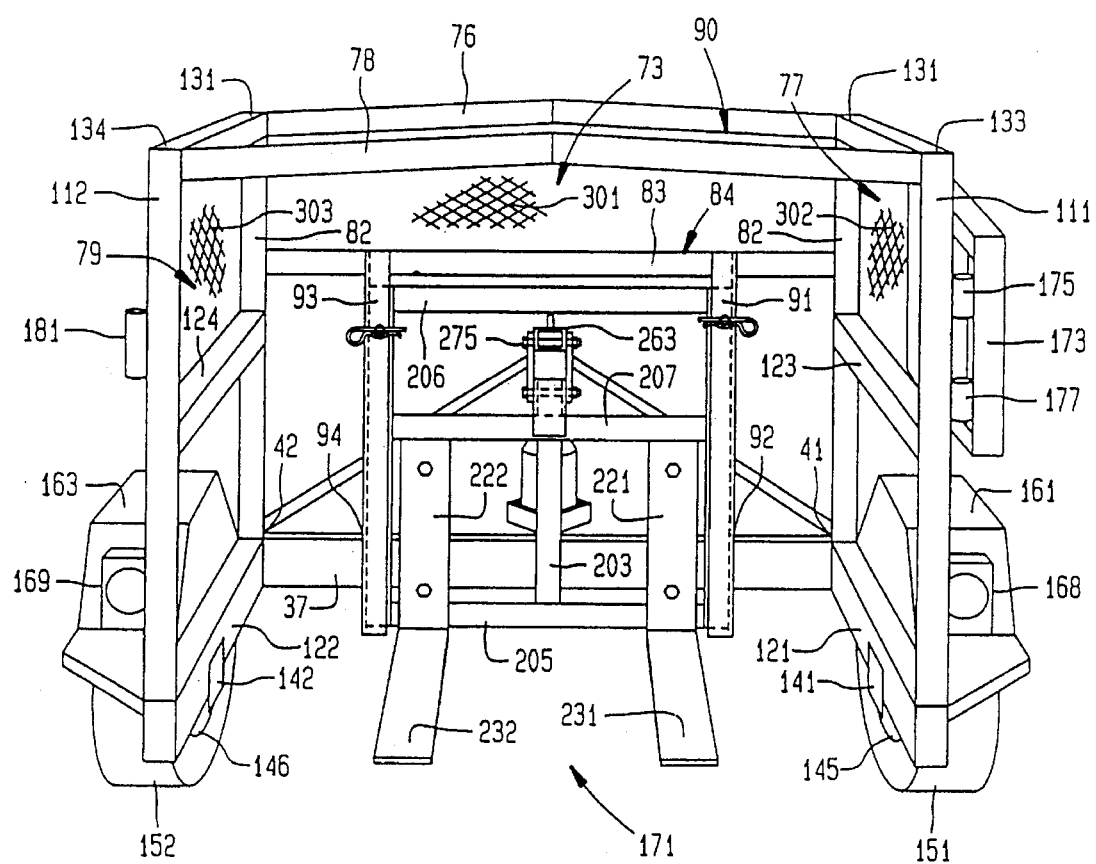
FIGS. 2 is a diagrammatic rear view illustration of the compact trailer of the present invention.
Figure 3:
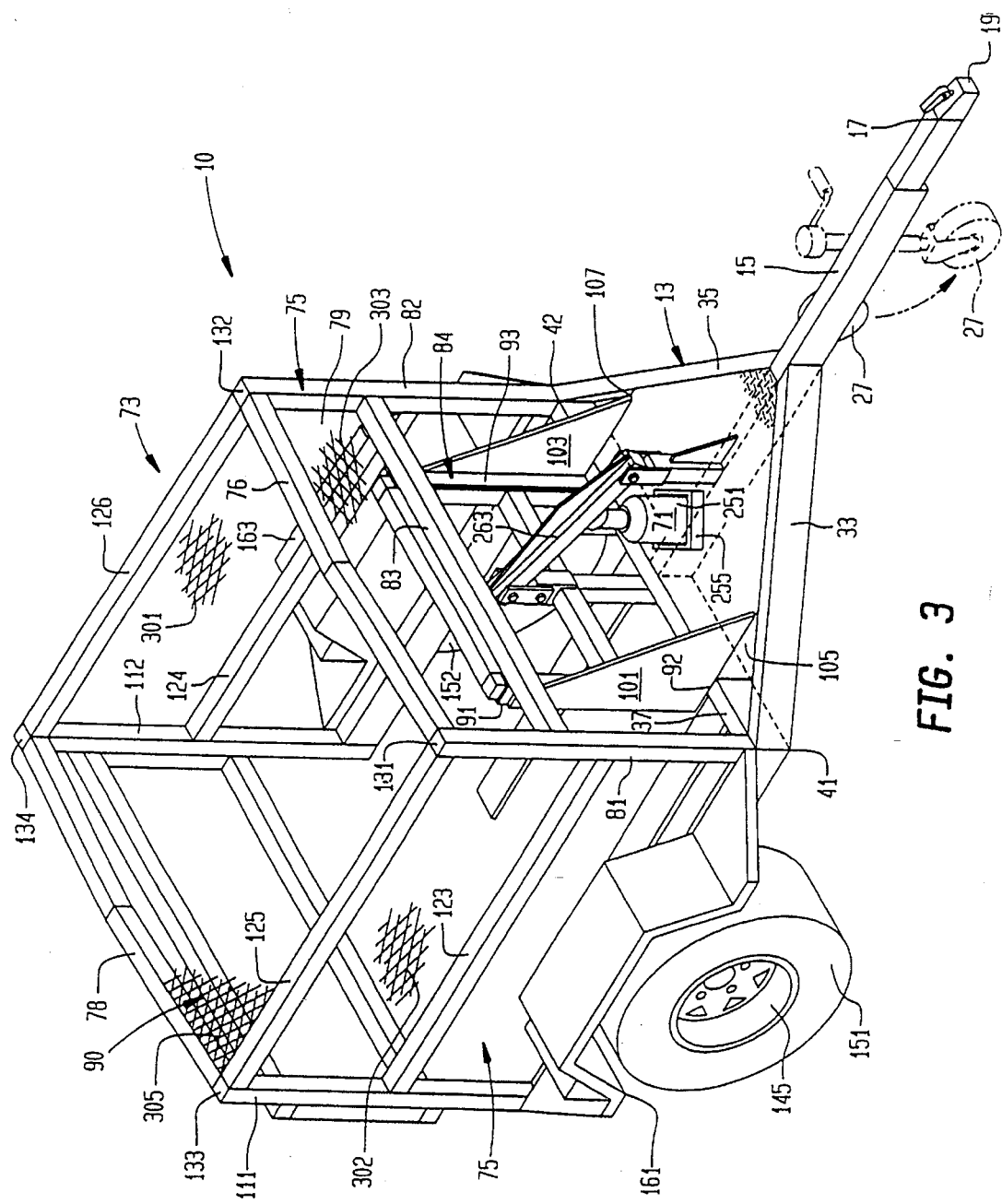
FIGS. 3 is a diagrammatic perspective view illustration of the compact trailer of the present invention.

The compact utility trailer of the present invention will now be described with reference to FIG. 1, which shows the trailer 10 attached to a towing vehicle, shown as a pick-up truck 12 adjacent to a pallet 14, and FIGS. 2–5 which are respective diagrammatic illustrations showing details of the trailer 10, per se. As shown therein, the trailer 10 comprises front end portion 11 configured as a generally triangularly-shaped frame 13, formed of welded together sections of generally rectangular or U-shaped cross-section steel channel. Specifically, triangular frame 13 is comprised of a first longitudinal section 15, a forward end 17 of which is fitted with a ball hitch attachment element 19, for attachment to a ball-shaped attachment fixture 21 secured to the rear end 23 of a towing vehicle, such as pick-up truck 12. Also secured to the first longitudinal section 15 of frame 13 is a pivotable support wheel 27, for supporting the forward end of the trailer in a generally horizontal position, when the trailer is in a free standing condition, not attached to a ball attachment fixture at the back of a towing vehicle.

Extending at an acute angle from a generally mid-location 31 along the length of longitudinal section 15 are first and second side truss members 33 and 35 which extend and are affixed (welded) to a rear truss member 37, thereby forming corners 41 and 42 of the triangular frame 13. The rearward-most portion of longitudinal section 15, shown in broken lines 16, is affixed (welded) to a generally central portion 38 of rear truss member 37, so that truss member 37 and longitudinal section 15 together form a generally T-shaped sub-frame within the triangular frame 13.

A floor member 51, which preferably comprises a section of pebble-surfaced (non skid tread patterned) sheet steel, has side flange portions 53, 55 and 57 thereof welded to interior wall portions 63, 65 and 67 of side truss members 33 and 35 and rear truss member 37, respectively, so as to provide a support surface for a hydraulic jack 71 and to enhance the rigidity of the triangular frame member.

Mounted to the front end portion 11 of triangular frame 13 is a generally housing or cage-shaped rear end portion 73, which is comprised of a vertically extending rectangular-shaped frame wall section 75 and a pair of vertically extending rectangular-shaped side wall sections 77 and 79 attached thereto. In addition, a roof section 81 is attached to the top of each of frame and side wall sections 75, 77 and 79. Like triangular frame 13, frame section 75 is comprised of welded together sections of generally rectangular or U-shaped cross-section steel channel, including vertical side members 81 and 82 welded to corners 41 and 42 of the triangular frame 13.

Affixed to and extending transverse to vertical side members 81 and 82 is a horizontal leg member 83, that forms a top portion of a sub-frame 84. Sub-frame 84 further includes side leg portions 91 and 93, which extend from locations 92 and 94 of rear truss member 37, spaced apart interiorly from corners 41 and 42 of the triangular frame 13. Welded to and extending forward of side leg portions 91 and 93 of sub-frame 84 are vertical gusset plates 101 and 103, which are also welded to side edge portions 105 and 107 of floor member 51.

Each of vertically extending rectangular-shaped side wall sections 77 and 79 is also comprised of welded together sections of generally rectangular or U-shaped cross-section steel channel. Specifically, side section wall 77 is formed as a generally rectangular frame define by vertical side member 81 and a vertical side member 111 at the rear of the trailer, which vertical side members are joined together by a bottom horizontal channel member 121, a horizontal leg member 123, located generally midway of vertical side members 81 and 111 and a generally horizontal roof leg member 125 welded to the top ends 131 and 133 of vertical side members 81 and 111. Similarly, side wall section 79 is formed as a generally rectangular frame define by vertical side member 82 and a vertical side member 112 at the rear of the trailer. These vertical side members of side wall section 79 are joined together by a bottom horizontal channel member 122, a horizontal leg member 124, located generally midway of vertical side members 82 and 112 and a generally horizontal roof leg member 126 welded to the top ends 132 and 134 of vertical side members 81 and 112. Top ends of the vertical side members 81 and 111 of side wall sections 77 and 79 are joined to top ends of the vertical side members 82 and 112 of side wall section 79 by roof leg members 76 and 78, thereby forming a roof frame structure 90.

Mounted generally midway along each of bottom horizontal channel members 121 and 122 are respective wheel axle-mounting brackets 141 and 142, to which respective trailer support wheels 145 and 146 upon which tires 151 and 152 are mounted. Shrouds for wheels 151 and 152 are provided by fenders 161 and 163, which, like floor member 51, are preferably formed of the above described pebble-surfaced steel sheet material, and are welded to bottom horizontal channel members 121 and 122 of side wall sections 77 and 79, respectively. For road safety, the rear end portion of each of fenders 161 and 163 is provided with safety lights 168 and 169 and reflective surfaces. Electrical energization of the lights may be provided by way of a conventional wiring harness (not shown), which is coupled to a harness connector at the forward end 17 of the longitudinal section 15, for attachment to a cable of the towing vehicle, as customarily employed for operating the lights of a towed trailer from the towing vehicle.

In order to close off the open end 171 of cage-shaped rear end portion 73 of the trailer, a generally rectangularly shaped half door 173, formed of a rectangular frame of sections of steel tubing, is attached by hinge members 175 and 177 to vertical side member 111. Half door 173 has a vertically slidable door closure bar, which is sized to be releasably insertable in a section of hollow cylindrical tubing 181 mounted to vertical side member 112, thereby allowing half door 173 to be opened and closed into a latched position at the rear of the trailer.

A fork lift guide 190 is formed by a pair of vertical sections of U-shaped channel 191 and 192, respectively welded to vertical side members 91 and 93 of sub-frame 84. The fork lift itself is comprised of a generally rectangular frame 200 having vertical side channel members 201 and 202 welded to a lower section 205 of horizontally extending steel channel, and to an upper section 206 of horizontally extending steel channel. Frame 200 further includes a generally centrally located vertical channel member 203 welded to lower section 205 and to a generally horizontal mid channel member 207. Channel member 203 extends above channel member 207 of frame 200, so as to allow attachment of a lever arm bracket, to be described, that is vertically pivoted about a fulcrum by the hydraulic jack 71 mounted on the frame 13, thereby enabling the fork lift frame 200 to be vertically translated within fork lift guide 190.

Figure 5:
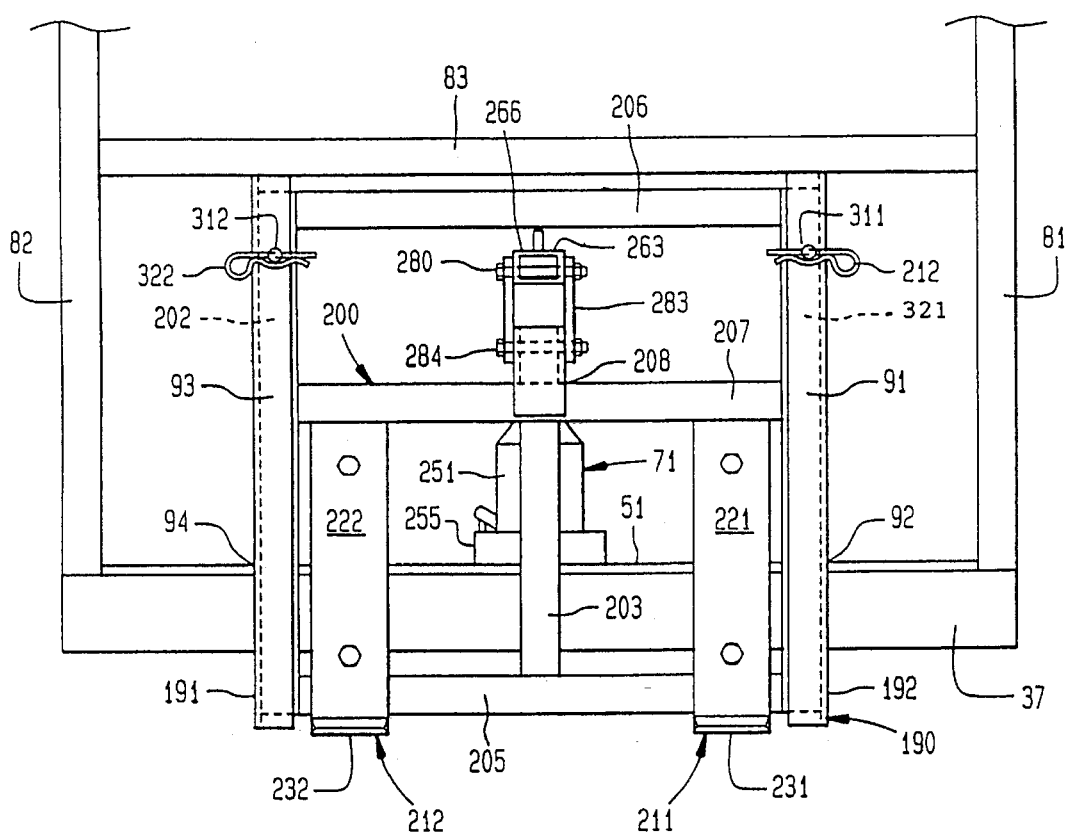
FIG. 5 is a diagrammatic rear view of the fork lift portion of the compact trailer of the present invention.

One or more (preferably a pair) of generally L-shaped fork plates 211 and 212, having vertical elements 221 and 222, from which extend horizontal fork or finger elements 231 and 232, respectively, are welded, along vertical elements 221 and 222 to the vertical side members adjacent to channel members 201 and 202 of frame 200. The vertical side channel members 201 and 202 of frame 200 are sized to slide within the respective U-shaped channel sections 191 and 192 of fork lift guide 190, so that the fork elements 221 and 222 may be vertically translated from a lowermost position at which a pallet may be engaged by the fork lift, and a raised position that provides sufficient clearance above the ground for transport of the pallet. To securely retain the fork lift frame in its transport position, steel safety pins 311 and 312, are respectively insertable through slots in vertical U-shaped channel sections 191 and 192 and vertical side channel members 201 and 202, and retained by way of cotter pins 321 and 322, as shown in FIG. 5.

Figure 4:
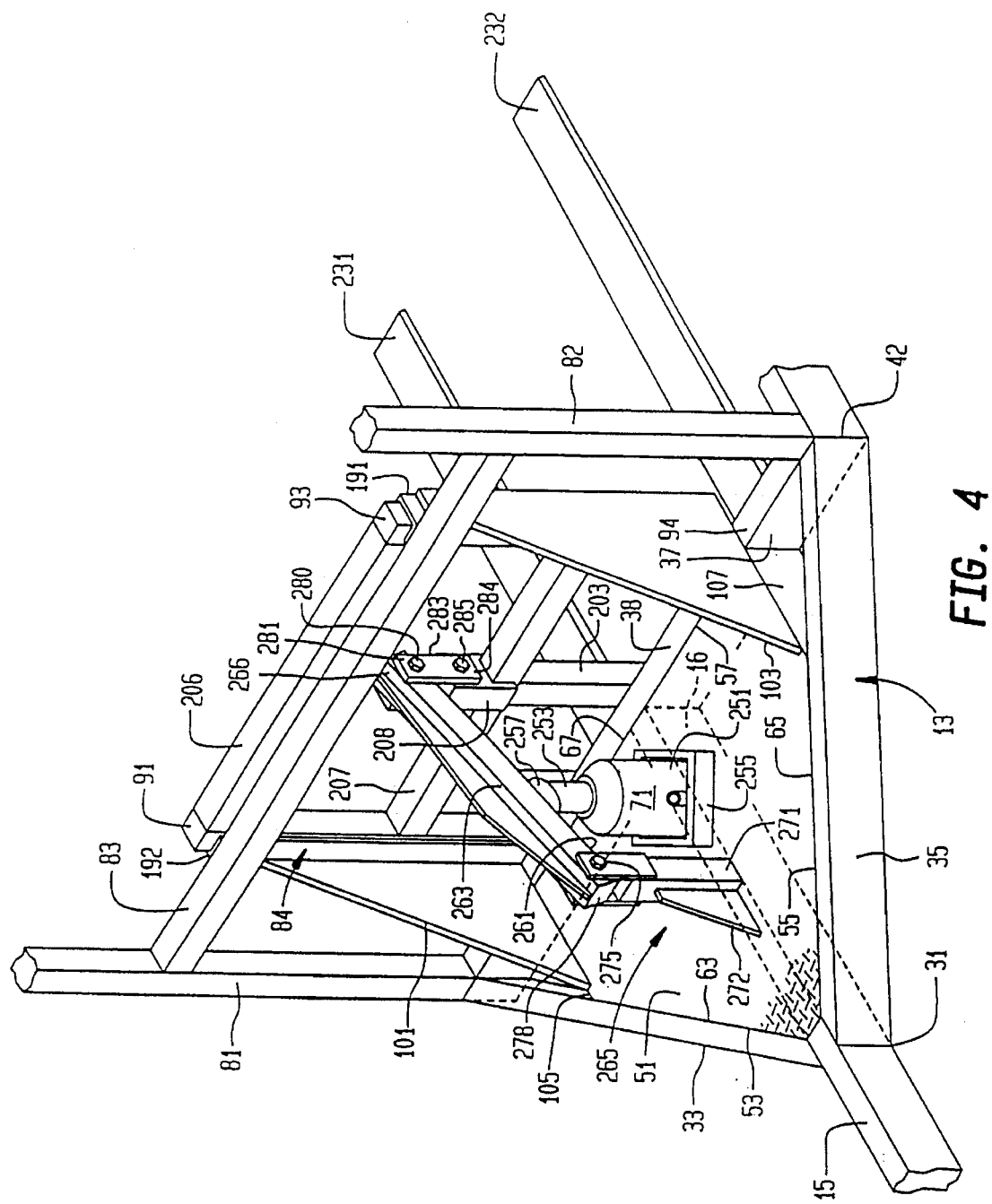
FIGS. 4 is an enlarged diagrammatic perspective view of the front end portion of the compact trailer of the present invention.

As noted above, in order to vertically translate the fork lift, floor member 51 supports a hydraulic jack 71 which, as shown in greater detail in FIG. 4, includes a hydraulic cylinder unit 251 into which a driven piston element 253 is vertically translatable. The lift capacity of hydraulic jack is not limited to a specific parameter and may be varied in accordance with the intended use of the fork lift. For accommodating a fork lift of the type commonly employed in warehouse and agricultural applications, a hydraulic lift capacity of ten tons may be employed. For manual operation, such the jack includes a pump lever element 72 which is sized to receive a lever handle for manually operating the jack.

To securely mount the hydraulic jack 71 on the floor 51 of frame 13, a jack base bracket 255 is welded to the floor 51. The upper end of driven piston element 253 is received within a generally cylindrical fitting 257 that is welded to the lower surface 261 of pivotable arm member 263 of a lever unit 265.

Lever unit 265 includes a vertically extending column member 271, which may be formed of steel channel, welded to floor member 51. Lever unit also includes a gusset plate 272 which is welded to column member 271 and to floor 51 for added rigidity and stability. Column member 271 has a slot in its upper end 278, for receiving a first end 264 of pivotable arm member 263. A horizontally extending pin 275 passes through a bore in column member 271 and through a corresponding bore in pivotable arm member, so as to provide a pivotable attachment of arm member 263 to column member 271, whereby pivotable arm member may pivot about the axis of the pin.

A second end 266 of pivotable arm member 263 is attached by way of a horizontal pin 280 to an upper end 281 of a pivot arm bracket 283, a lower end 285 of which is pivotably attached, via a pin 284, to that portion 208 of channel member 203 which extends above channel member 207 of frame 200. This attachment allows pivotable arm member 263 to be vertically pivoted about a fulcrum at pin 275, by vertical movement of the driven piston element 253 of the hydraulic jack 71 against the fitting 257 welded to the lower surface 261 of pivotable arm member 263 of the lever unit 265. The hydraulic jack is operated by manual control of a jack lever handle, as described above, thereby enabling the fork lift frame 200 to be vertically translated within fork lift guide 190.

To provide additional structural rigidity to and enclose the generally cage-shaped rear end portion of the trailer, the respective frame members may be shrouded with a covering, such as layers 301, 302, 303 of solid or mesh steel affixed to each of the vertically extending rectangular-shaped wall frame section 75 and the pair of vertically extending rectangular-shaped side wall sections 77 and 79. In addition, a layer of solid or mesh steel overlay 305 is affixed to the roof frame structure 90, and to half door 173.

Operation of the compact forklift trailer of the present invention is as follows. To seize a pallet of material, the rear half door 173 is opened, and the hydraulic jack 71 is manually operated, so as to pivotally rotate arm 263 downwardly about horizontally extending pin 275 in column member 271, and thereby vertically translate fork lift frame 200 in fork lift channels 191 and 192 towards the ground, so that the fork plates 211 and 212 are lowered to a horizontal position at which the fork plates may be inserted into the open frame of a support pallet. The trailer is then backed over the support pallet upon which the material to be transported is situated, so that the fork plates engage the pallet. Hydraulic jack 71 is then operated to raise drive piston element 253 and rotate pivot arm 263 upwardly about pin 275, thereby lifting fork lift frame 200 within fork lift channels 191 and 192, and raising the pallet off the ground to a transport, road clearance position within cage-shaped rear end portion 73. The rear half door is then closed, so that the trailer may be towed. At the delivery site, the above sequence is reversed, so that the pallet is deposited on the ground.

As will be appreciated from the foregoing description, the compact utility trailer of the present invention facilitates pick-up and delivery of relatively small sized lots of material. Not only is the trailer readily towable behind a variety of commonly driven vehicles such as automobiles, pick-up trucks and the like, but contains a hand operated hydraulic jack-operated forklift that allows a pallet of material to be easily seized and lifted into a transport position within the confines of the trailer. The trailer may then be towed to a delivery site, where the forklift is operated to lower the pallet onto the ground.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A compact utility trailer towable behind a towing vehicle, comprising a trailer hitch attachment element for attachment to a trailer attachment fixture that is secured to said towing vehicle, a forklift support structure supported by way of trailer support wheels that allow said trailer to be towed, said forklift support structure including a pair of vertically extending, mutually opposed rectilinear forklift guide channels, and a forklift by which a pallet is seized for transport by said trailer, said forklift being comprised of a vertically extending, rectilinear forklift frame having rectilinear vertical members that are sized to fit and extend vertically and rectilinearly within said pair of vertically extending, mutually opposed rectilinear forklift guide channels and be vertically and linearly slidable within said pair of vertically extending, mutually opposed rectilinear forklift guide channels of said forklift support structure, and a pair of generally L-shaped fork plates affixed to said vertically extending, rectilinear forklift frame, with vertical and linear slidable translation of said vertically extending, rectilinear forklift frame within said pair of vertically extending, mutually opposed rectilinear forklift guide channels precluding rotation of said generally L-shaped fork plates in the course of seizure and lifting of said pallet by said generally L-shaped fork plates, and a jack supported by said forklift support structure and having a driven element that is translatable relative to said forklift support structure, said driven element being coupled by a linkage to said vertically extending, rectilinear forklift frame, whereby operation of said jack causes said vertical and rectilinear sliding translation of said vertically extending, rectilinear forklift frame within said pair of vertically extending, mutually opposed rectilinear forklift guide channels, and thereby vertical and linear translation, without rotation, of said generally L-shaped fork plates.

2. A compact utility trailer according to claim 1, further including a pair of elements which engage said vertically extending, rectilinear forklift frame and said pair of vertically extending, mutually opposed rectilinear forklift guide channels of said forklift support structure, so as to secure said vertically extending, rectilinear forklift frame in a transport position, irrespective of an extended position the driven element of said jack.

3. A compact utility trailer according to claim 1, wherein said forklift structure is comprised of a vertically extending rectangular-shaped forward wall section by way of which said pair of vertically extending, mutually opposed rectilinear forklift guide channels are supported, and a pair of vertically extending rectangular-shaped side wall sections, and includes a roof section attached to top portions of said forward wall and side wall sections.

4. A compact utility trailer according to claim 3, wherein each of the vertically extending rectangular-shaped side wall sections is formed as a generally rectangular frame defined by a pair of vertical side members, one at a forward end of the trailer and one at a rear end of the trailer, and where said vertical side members are joined together by a bottom horizontal channel member, a horizontal leg member located above said bottom horizontal channel member and joined to said vertical side members, and a generally horizontal roof leg member joined to top ends of the vertical side members, said top ends of said vertical side members being joined together by roof leg members, thereby forming a roof frame structure.

5. A compact utility trailer according to claim 4, wherein said forward end of said trailer further includes a generally triangularly-shaped frame of rigid metal channel, and first and second side truss channel members which extend and are affixed to a rear truss member, thereby forming corners of said triangularly-shaped frame to which said trailer hitch attachment element is joined.

6. A compact utility trailer according to claim 4, wherein wheel axle-mounting brackets for said trailer support wheels are mounted to each of said side wall sections, with fenders being affixed to said side wall sections, and wherein a rear end of said a forklift support structure of said trailer is closable by means of a generally rectangularly shaped door, attached by hinge members to one of said vertical side members.

7. A compact utility trailer according to claim 6, further including steel mesh affixed to said forklift support structure.

8. A compact utility trailer according to claim 1, wherein said linkage which couples said driven element to said vertically extending, rectilinear forklift frame includes a pin engaging said vertically extending, rectilinear forklift frame.

9. A compact utility trailer according to claim 1, further including at least one element which retains said vertically extending, rectilinear forklift frame within said pair of vertically extending, mutually opposed rectilinear forklift guide channels of said forklift support structure, so as to secure said vertically extending, rectilinear forklift frame in a transport position, irrespective of an extended position driven element of said jack.

10. A compact utility trailer according to claim 9, wherein said at least one element comprises a pair of locking elements which engage said vertically extending, rectilinear forklift frame and said pair of vertically extending, mutually opposed rectilinear forklift guide channels of said forklift support structure.

11. A compact utility trailer according to claim 10, wherein said pair of locking elements include pins.

* * * * *